(12) United States Patent
Amirian et al.

(10) Patent No.: US 11,048,287 B1
(45) Date of Patent: Jun. 29, 2021

(54) MOUNTING ASSEMBLY FOR A CONTROL PEDAL OF A VEHICLE

(71) Applicant: CJ Automotive AB, Dalstorp (SE)

(72) Inventors: Mahdi Amirian, Borås (SE); Bill Åström, Ringarum (SE)

(73) Assignee: CJ Automotive AB, Dalstorp (SE)

( * ) Notice: Subject to any disclaimer, the term of this patent is extended or adjusted under 35 U.S.C. 154(b) by 0 days.

(21) Appl. No.: 17/113,325

(22) Filed: Dec. 7, 2020

(30) Foreign Application Priority Data

Dec. 17, 2019 (SE) ................................ 1951474-4

(51) Int. Cl.
  *G05G 1/44* (2008.04)
(52) U.S. Cl.
  CPC ..................... *G05G 1/44* (2013.01)
(58) Field of Classification Search
  CPC ........................................................ G05G 1/44
  See application file for complete search history.

(56) References Cited

U.S. PATENT DOCUMENTS

| 5,588,338 | A | 12/1996 | Carr et al. | |
|---|---|---|---|---|
| 2006/0053957 | A1 | 3/2006 | Ewel et al. | |
| 2019/0004560 | A1* | 1/2019 | Strom | F16C 11/04 |
| 2019/0322250 | A1* | 10/2019 | Jarjoura | G05G 1/327 |

FOREIGN PATENT DOCUMENTS

| DE | 4230150 A1 | 3/1993 |
|---|---|---|
| DE | 10336799 A1 | 3/2005 |
| EP | 1233321 A2 | 8/2002 |
| FR | 2796012 A1 | 1/2001 |
| JP | 2009169818 A | 7/2009 |
| SE | 538832 02 | 12/2016 |

OTHER PUBLICATIONS

Swedish Search Report (Dec. 17, 2019) for corresponding Swedish App. 1951474-4.

* cited by examiner

*Primary Examiner* — Vicky A Johnson
(74) *Attorney, Agent, or Firm* — WRB-IP LLP

(57) ABSTRACT

A mounting assembly for a control pedal of a vehicle, which assembly includes two parallel walls, a pivot shaft extending between the walls, two locking arrangement arranged to pivotally retain the pivot shaft in a locked using position between the walls, and at least a control pedal rigidly provided on the pivot shaft. The control pedal and the pivot shaft are rotatable around an axis of rotation and the locking arrangement includes at least one lock protrusion extending radially from an outer surface and the respective wall includes at least one locking clamp and one stop, which clamp and stop the lock protrusion is arranged to engage with, to prevent a disengagement of the locking arrangement from the wall.

14 Claims, 4 Drawing Sheets

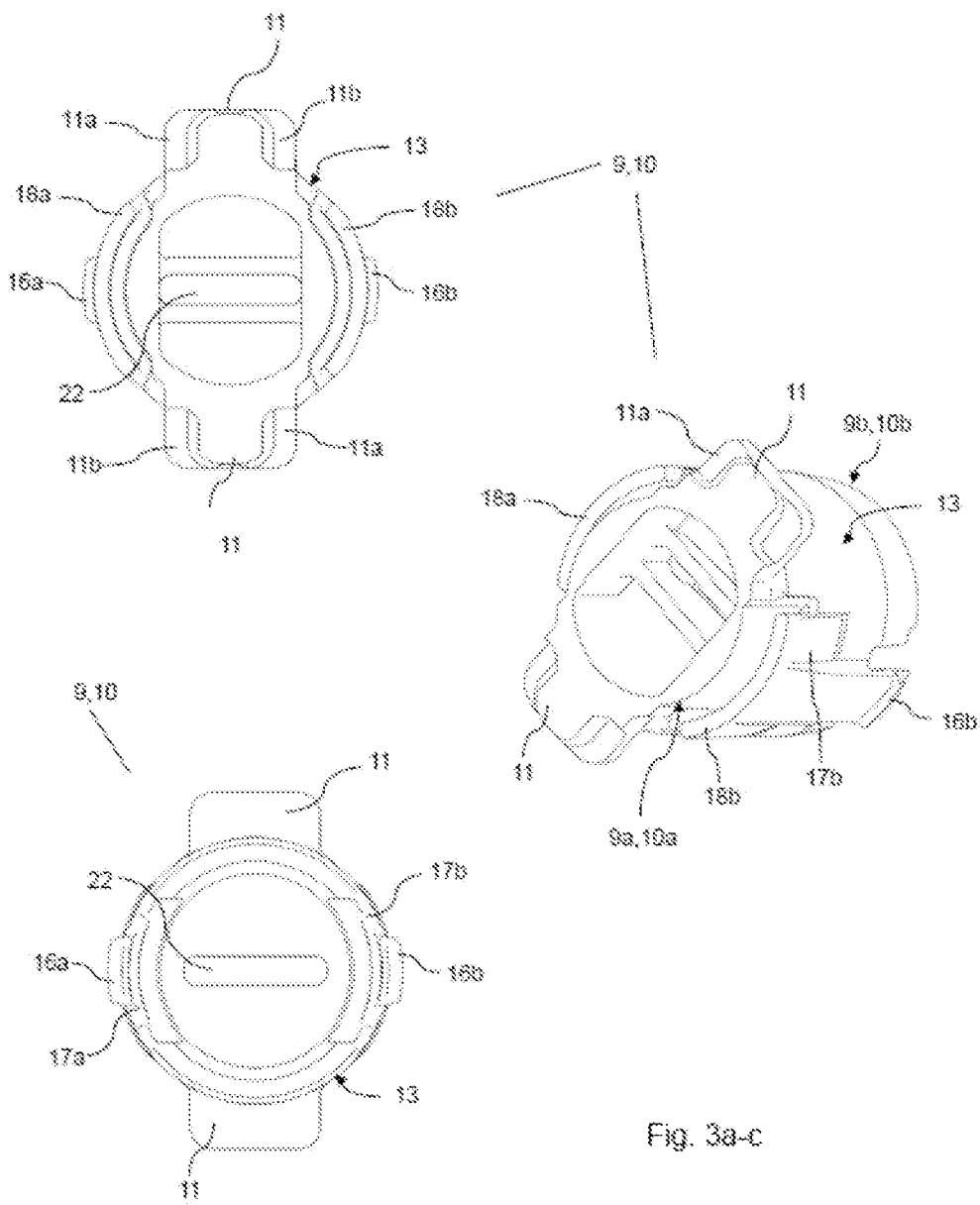
Fig. 3a-c

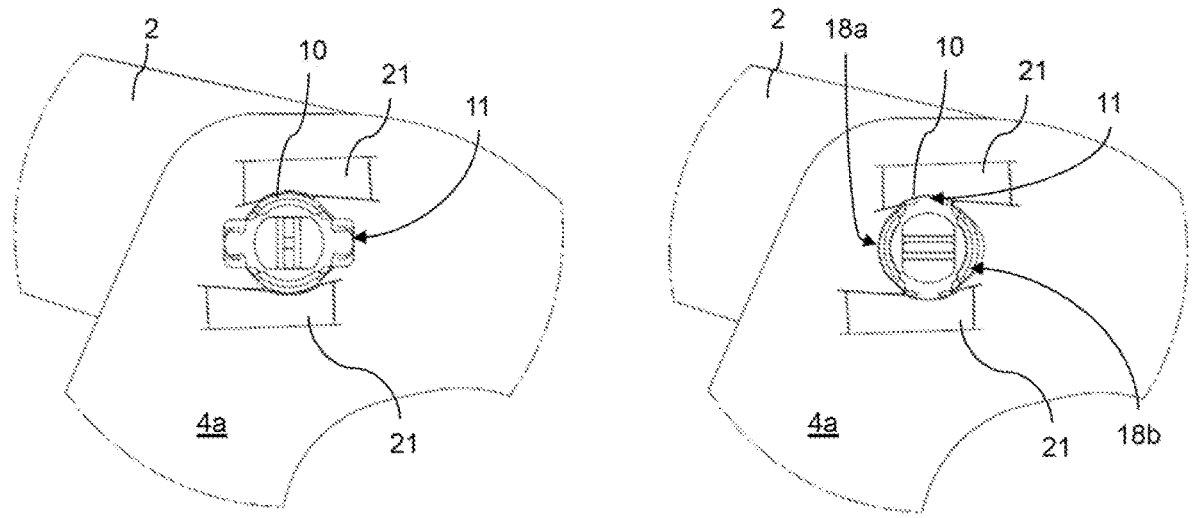
Fig. 4a-b
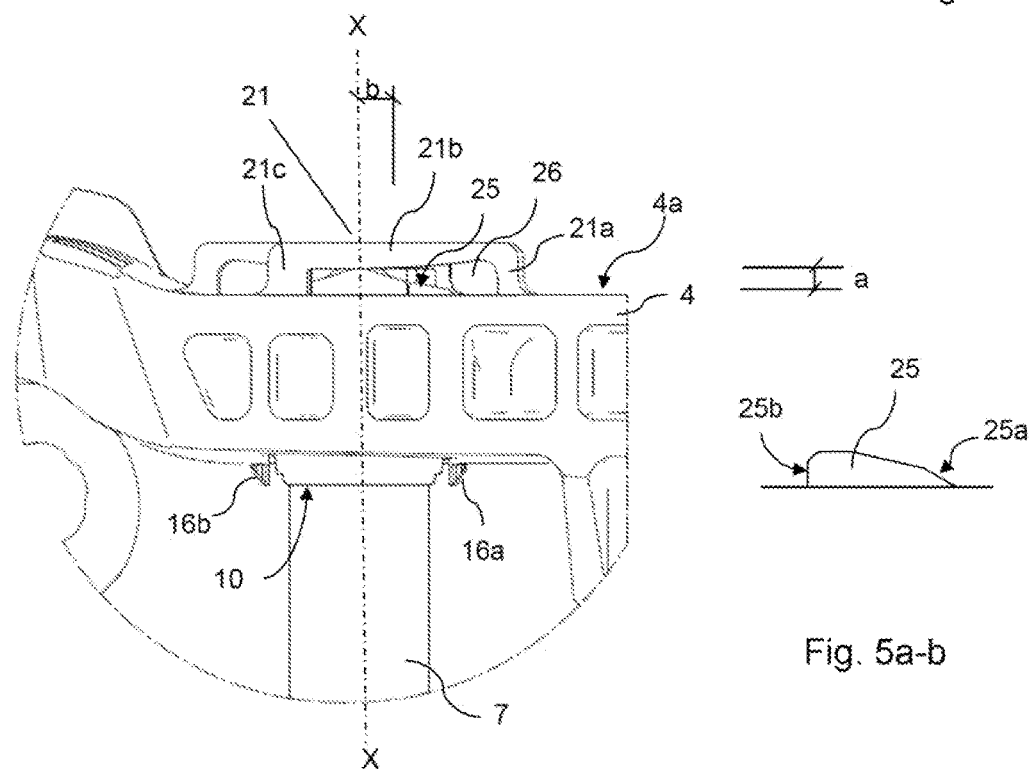
Fig. 5a-b

MOUNTING ASSEMBLY FOR A CONTROL PEDAL OF A VEHICLE

BACKGROUND AND SUMMARY

The present invention relates generally to a mounting assembly for a control pedal of a vehicle which is cost efficient and time-saving both during production of parts of the mounting assembly as well as during assembly of the control pedal.

In the vehicle industry, the manufacturers strive towards a more time efficient and cost-conscious assembly of the vehicles, this to minimize the manufacturing cost. Further, the manufacturers also strive towards a simple design of the included components and sometimes also with integrated multiple functionalities which imply that less components are needed. A component design with few components that are time efficient to assembly are thus worth aiming at to achieve a cost efficient assembly.

From prior art it is known multiple mounting assemblies for control pedals in vehicles. In U.S. Pat. No. 5,588,338 a mounting for a control pedal in a motor vehicle is described. The mounting includes a mounting bracket fixed relative to the vehicle having apertures defining an axis of rotation. The pedal has a hub defining pivot axis. In the hub spring loaded bearings are adapted to automatically snap axially outward from a first position to a second position, thereby rotatably connecting the pedal with the bracket, when the pivot axis is aligned with the axis of rotation. Pedal end caps are snapped onto the hub and interposed between the hub and the bracket. A drawback with the mounting assembly according to prior art is that it is composed of several individual components which makes the assembly of the mounting assembly time consuming and also expensive to manufacture, due to the large number of included components.

Another mounting assembly for a control pedal in a motor vehicle is presented in SE 1550871-6. This mounting assembly achieves an improved and shortened assembly time and comprises a pivot shaft extending between two walls, two locking means arranged to pivotally retain the pivot shaft in a use position between the walls and further a control pedal which is rigidly provided on the pivot shaft. The control pedal and the pivot shaft are rotatable around an axis of rotation. Further, the mounting assembly is provided with two joints on respective sides of the pivot shaft. Each joint comprises a lock protrusion provided on a locking means for cooperation with an internal groove provided in each of the walls. The respective lock protrusion is arranged to engage with the internal groove of the wall when the locking means is in a use position. By this, a controlled rotational and axial movement of the locking means in relation to the wall is achieved when the locking means are mounted in a use position. The locking means further comprises a rotating prevention protrusion extending radially from an outer surface of the locking means, which protrusion is arranged to engage with a stop arranged on the walls when the locking means is in the use position. Such a rotating prevention protrusion in co-operation with the stop prevents the locking means from rotating in relation to the wall when in the use position. This solution has good functionality but having some drawbacks. First of all, it is quite complicated to produce the walls because of the internal groove, which geometry has to be incorporated inside the wall. Further, it is hard to visually check that the locking means are correct and safely assembled in the groove since it an internal groove.

It is desirable to provide a mounting assembly for a control pedal of a vehicle, which is achieves a cost-efficient mounting assembly with improved and shortened assembly time. It is also desirable to provide an alternative mounting assembly compared to SE 1550871-6, still with a robust, and reliable mounting assembly and with freedom from play.

According to an aspect of the invention, the mounting assembly for a control pedal of a vehicle comprises two walls arranged in parallel in relation to each other and each wall having a respective through opening. Further, a pivot shaft extending between the walls, wherein the pivot shaft has its respective end inserted into the respective through opening and at least a control pedal is rigidly provided on the pivot shaft. The control pedal and pivot shaft are rotatable around an axis of rotation. Further, two locking means are arranged to pivotally retain the pivot shaft between the walls by that the respective locking means is positioned onto the respective end of the pivot shaft and is inserted into the respective through opening of the respective wall. The respective through opening is arranged to receive one locking means and the respective through opening has a shape complementary to the outer circumferential shape of the locking means, so as to be able to insert the locking means into the through opening.

The locking means is rotatable in the through opening from a first mounting position to a locked using position and the locking means further comprising at least one lock protrusion, which extends radially from an outer surface of a first axial end of the locking means. Further, the respective wall of the mounting assembly comprises—on a first side which faces away from the other wall—at least one external locking clamp and at least one stop. The at least one lock protrusion of the locking means is arranged to engage with the locking clamp and the stop, when the locking means is in the locked using position, wherein a disengagement of the locking means is prevented.

The clamp and the stop are positioned such as the lock protrusion is held in the locked using position, why the locking means is prevented from disengagement from using position in the through opening of the wall. By the locking means having a lock protrusion arranged to engage with the locking clamp and the stop, a controlled rotational and axial movement of the locking means in relation to the wall is achieved when the locking means is rotated from the mounting position in the through opening to the locked using position. In the locked using position, the locking means is prevented from rotating in relation to the wall when in the locked using position and the locking means is further prevented from loosening from the through opening of the wall.

According to an aspect of the invention, the locking clamp comprises first and second shanks connected to each other by an elongate mid-section and the shanks are further fixedly attached to the first side of the wall and protrudes a first distance from the first side of the wall such as a receiving space is formed between the first side of the wall and the locking clamp. The receiving space is arranged for receiving the lock protrusion of the locking means when the locking means is rotated from mounting position to the using position. When the locking means is rotated from the mounting position towards the locked using position, the lock protrusion passes the first shank of the clamp and moves further into the receiving space, i.e. under the clamp. The lock protrusion then passes over the stop and snaps in place between the stop and the second shank of the clamp, wherein a further rotation is prevented.

According to an aspect of the invention, the stop is arranged in line with the mid-section of the locking clamp and protrudes from the first side of the wall in direction towards the mid-section of the locking clamp. The distance between the top surface of the stop and the mid-section of the clamp is adopted to allow the lock protrusion to slide over the stop, when the locking means is rotated from the mounting position to the locked using position. Other options of the positioning of the stop is possible, the main object is that the clamp and the stop should prevent the rotation of the locking means in the locked using position. For example, the stop may be arranged outside the mid-section of the clamp and further, the entire clamp may be positioned "outside" the through opening, that is outside the circumference of the trough hole of the wall (preferred) if seen in the axial direction of the locking means and the through opening.

According to an aspect of the invention, the stop is wedge-shaped with a tip, i.e. having a ramp-surface, and further an, in relation to the tip, opposite stop edge. By that the stop is arranged to, during the rotation of the locking means in the through opening—from the mounting position to the locked using position—guide the at least one lock protrusion towards the locked using position, in which position the lock protrusion is locked between the stop edge of the stop and the second shank of the locking clamp. The wedge-shape facilitates an easy mounting of the locking means to the locked using position, while rotating the locking means in the through opening, where the lock protrusion of the locking means slides over the beveled edge. When the lock protrusion is in the locked using position between the stop edge of the stop and the second shank of the clamp, a further rotation of the locking means is prevented.

According to an aspect of the invention, the locking clamp is resilient. The reason for this is to achieve a certain flexibility in the clamp and by that enable a smooth and easy sliding of the lock protrusion over the ramp surface of the clamp. After this, the lock protrusion snaps over the stop edge and by that is safely locked in the locked using position.

According to an aspect of the invention, the lock protrusion comprises at least one chamfered side edge, which side edge extends radially from the outer surface of the of the locking means. The side edge is by that chamfered in the "rotation direction" which means that the side edge of the lock protrusion, which during rotation of the locking means from the mounting position to the locked using position first enters the receiving space of the locking clamp, is chamfered. That is so to speak the front side edge of the lock protrusion. The chamfering is provided to enable an easy sliding of the lock protrusion over the ramp-surface of the stop at the same time as it is held by the locking clamp. Preferably, the lock protrusion also is chamfered on the opposite side edge, i.e. the back side edge of the lock protrusion. This enables an even easier rotation of the locking means from the mounting position to the locked using position.

According to an aspect of the invention, a midpoint of the mid-section of the locking clamp is displaced a distance relative the axis of rotation of the pivot shaft. This, for allowing the at least one lock protrusion to pass the first shank of the clamp and enter the receiving space, when the locking means is rotated into the through opening of the wall, from the mounting position to the locked using position. Seen from a top-view (or an outside) of the wall and in direction towards the mounted locking means in the through opening of the wall, i.e. seen in the axial direction of the pivot shaft and the locking means, the mid-point of the mid-section of the clamp is displaced in relation to the axis of rotation. By having the clamp a bit displaced, the "entrance side" of the clamp is open for entrance of the lock protrusion and further, the locked using position where the lock protrusion is arranged between the stop and the second shank of the clamp substantially aligns with the axis of rotation.

According to an aspect of the invention, the locking means further comprises one or more first axial securing protrusions, which protrudes in a radial direction from an outer surface of the locking means, and the first axial securing protrusions are arranged at a second axial end of the locking means. The first axial securing protrusion is deflectable which provides a snapping outwardly at the backside of the wall when the locking means reaches an end position in the mounting position. By this, the locking means may be axially snapped into the through opening of the wall and is thereby prevented from movement of the locking means in an axial direction back out of the opening and is ready for rotation from the mounting position to the locked using position.

According to an aspect of the invention, the locking means further comprises one or more resilient tongues, which protrudes in a radial direction from an outer surface of the locking means. The resilient tongue is arranged at the outer surface of the locking means. Since the respective through opening of the wall has a shape complementary to the outer circumferential shape of the locking means, the locking means fits the though hole quite well. But du to tolerance issues and to be able to mount the locking means into the though hole of the wall, a certain play is needed. Since the resilient tongue protrudes a bit from the outer surface in the radial direction of the locking means, the play is taken care of by the flexibility of the resilient tongue.

According to an aspect of the invention, the resilient tongue comprises the first axial securing protrusion.

According to an aspect of the invention, the resilient tongue comprises a second axial securing protrusion arranged at the first axial end of the locking means. The second axial securing protrusion acts as a stop when introducing the locking means into the through opening of the wall, such as the locking means do not pass through the through opening, but instead stops at a wanted position (the mounting position). In this position, the second securing protrusion preferably abuts the wall and the first securing protrusion is as explained above snapped behind the wall. Thereby, the locking means is axially secured in both axial directions.

According to an aspect of the invention, the at least one locking means is provided with a grip for enabling movement of the locking means from the mounting position to the fixed using position. The grip may for example be a flat-shaped groove or through opening, a cross-shaped groove or through opening, a hex key grip or the like.

According to an aspect of the invention, the mid-section of the locking clamp is thinner near the first shank compared to near the second shank. This to enable a free entrance for the lock protrusion when rotating the locking means from the mounting position to the locked using position.

According to an aspect of the invention, the mounting assembly is manufactured of a polymeric material.

BRIEF DESCRIPTION OF DRAWINGS

The invention is now described, by way of example, with reference to the accompanying drawings, in which:

FIG. 3a-c show a top view, a perspective view and a bottom view of a locking means according to the invention.

FIG. 4-b show side views of one sidewall of the mounting assembly when the locking means according to the invention, is in a mounting position (FIG. 4a to the left) and a locked using position (FIG. 4b to the right).

FIG. 5a is a zoomed view and from above, relating to FIG. 4a-b, showing an area near the side wall in which one locking means according to the invention is in a locked using position.

FIG. 5b is a zoomed view of a stop (stop-protrusion) according to the invention.

DETAILED DESCRIPTION

In the following, a detailed description of a mounting assembly 1 according to the invention is disclosed in detail in respect of embodiments and in reference to the accompanying drawings. All examples herein should be seen as part of general description and therefore possible to combine in any way in general terms.

Figure 1:
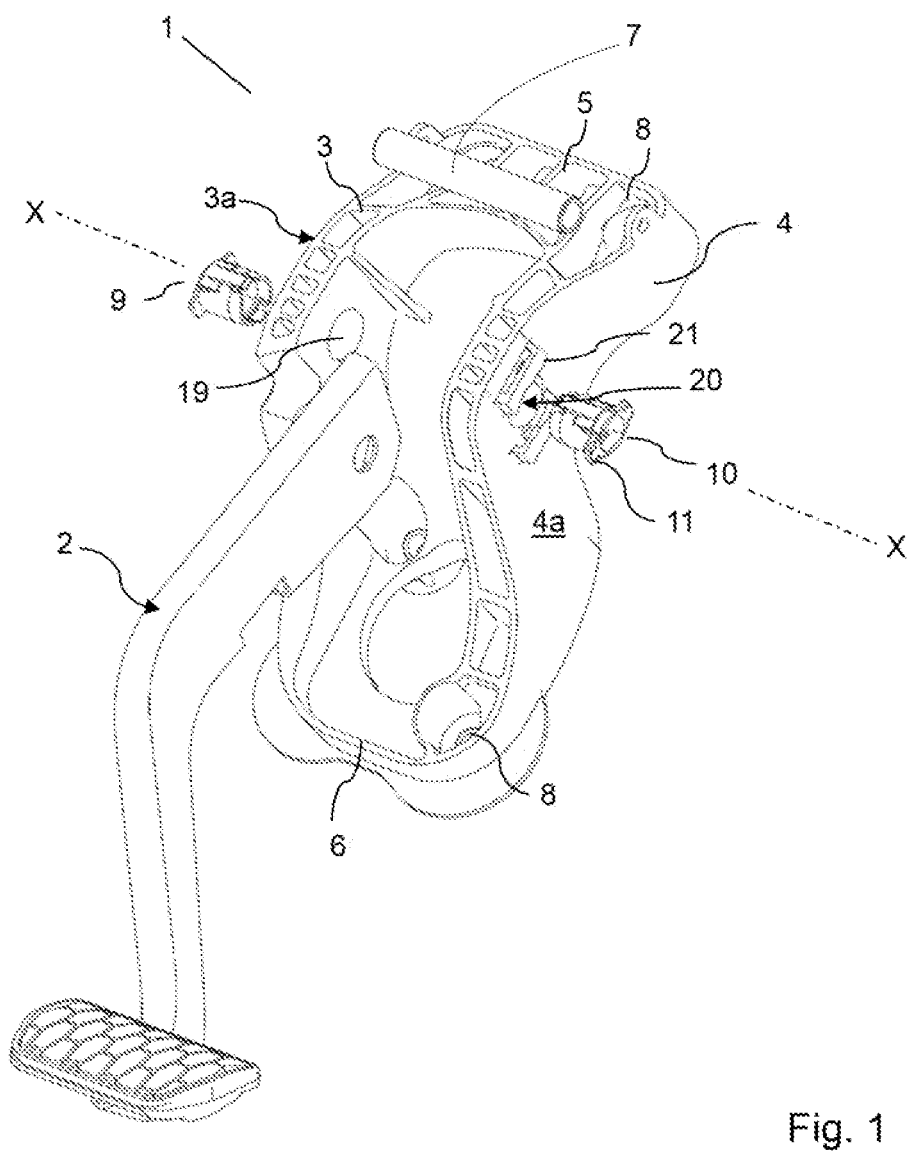
FIG. 1 shows an exploded isometric view of a mounting assembly according to the invention.
Figure 2:
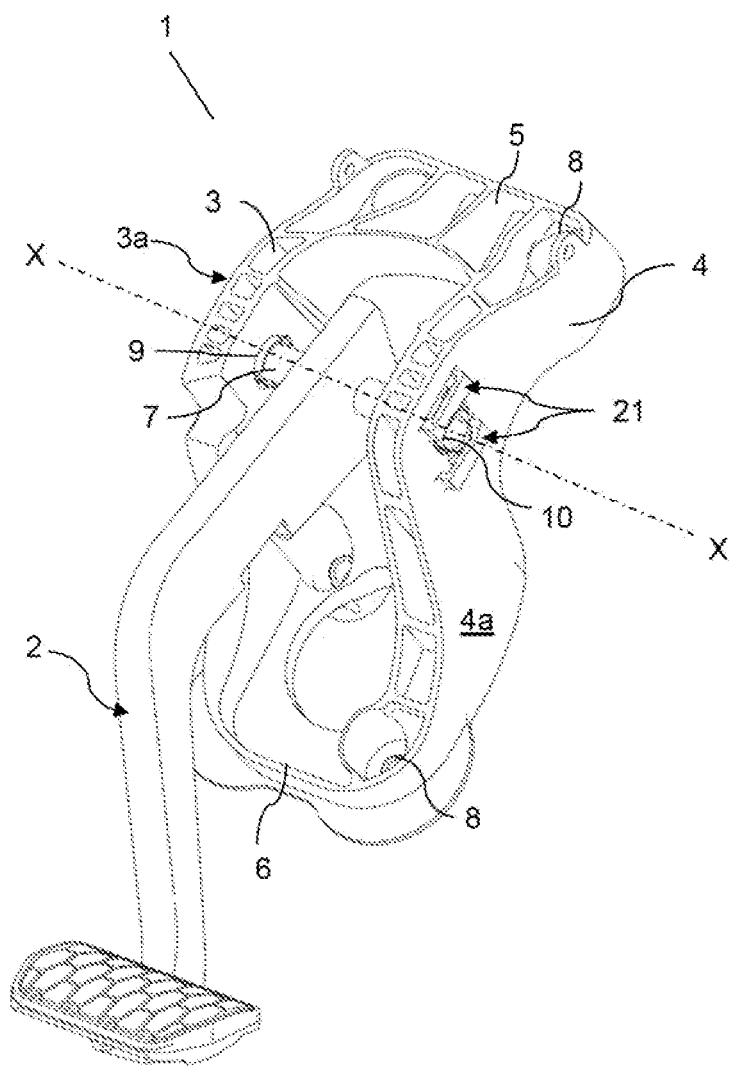
FIG. 2 shows an isometric view in an assembled state of the mounting assembly.

FIG. 1 shows an exploded isometric view and FIG. 2 shows an isometric view in an assembled state of the mounting assembly 1. The mounting assembly 1 is arranged for pivotally supporting one or more control pedals 2 of a vehicle. The control pedal 2 may be a brake pedal, a clutch pedal or an accelerator pedal, or a group of two or more such pedals arranged around an axis of rotation X.

The mounting assembly 1 comprises two walls 3, 4 arranged in parallel in relation to each other, and a first side 3a, 4a of the respective wall faces away from the other wall 3, 4. The first side 3a, 4a of each wall thereby can be seen as an outer wall in FIG. 1-2. Opposite the respective first side 3a, 4a is a respective inner side of the wall 3, 4 facing the other wall 3, 4. The walls 3, 4 are rigidly joined together by means of an upper wall 5 and a lower wall 6. The walls 3, 4 are preferably generally perpendicularly arranged in relation to the upper wall 5 and lower wall 6, but the upper and lower walls 5, 6 may have other designs than in the figures. The upper wall 5 and the lower wall are provided with mounting holes 8 by means of which the mounting assembly 1 is fixed to the interior of the vehicle. The walls 3, 4 are also connected by means of a pivot shaft 7 which extend between the walls 3, 4. The pivot shaft 7 is preferably a cylindrical member, hollow or solid, but may also have any other configuration that is suitable for its use. At least a control pedal 2 is rigidly provided on the pivot shaft 7, such that the control pedal 2 may rotate in unison with the pivot shaft 7. In the center point of the cylindrical pivot shaft 7 an axis of rotation X is "arranged", around which the control pedal 2 and the pivot shaft 7 may rotate. The two locking means 9, 10 are arranged to pivotally retain the pivot shaft 7 in a using position between the walls 3, 4 by that the locking means 9, 10 are positioned on a respective end of the shaft 7 and are further positioned in a respective through opening 19, 20. The respective through opening 19, 20 is arranged to receive one locking means 9, 10 and the respective through opening 19, 20 has a shape complementary to the outer circumferential shape of the locking means 9, 10. Further, the locking means 9, 10 is rotatable in the through opening 19, 20 from the mounting position to the locked using position. The locking means 9, 10 comprises a side wall shaped as a hollow tube and an inner diameter of the locking means 9, 10 of the hollow tube is larger than an outer diameter of the pivot shaft 7. This to allow the pivot shaft 7 to rotate within the locking means 9, 10 when the control pedal 2 is operated by a driver of the vehicle.

The use position is a locked using position, in which the locking means pivotally retains the shaft 7 between the walls 3, 4, i.e. the shaft may be pivoted but is held in position between the walls 3, 4.

The mounting assembly 1 is provided with a kind of a bayonet joint by that the locking means 9, 10 comprises at least one lock protrusion 11 provided on the locking means 9, 10 and, according to the preferred embodiment the walls 3, 4 are provided with at least one clamp 21, preferably two clamps 21, arranged at opposite sides of the respective through opening 19, 20. The lock protrusion 11, the clamp 21 are arranged to engage with each other when the locking means 9, 10 is in the locked using position (see FIG. 4a-b), thereby preventing disengagement of the two locking means 9, 10 from the walls 3, 4, when in the locked using position. The bayonet joint further may comprise a rotation prevention protrusion in the form of a stop 25, which will be described in relation to FIG. 4a-b and FIG. 5a-b.

FIG. 3a-c show a top view, a perspective view and a bottom view of the locking means 9, 10 according to the invention. The locking means 9, 10 has a cylindrical shaped casing, which in a cross section X is substantially tube-shaped. The function of the locking means 9, 10 is to hold the pivot shaft 7 and its control pedal 2 securely in place between the walls 3, 4, but also to minimize the play between the pivot shaft 7 and the walls 3, 4 and to act as a bearing for the pivot shaft 7, when a user applies a force to the control pedal 2 by means of a foot, and the pivot shaft 7 rotates around the axis of rotation X.

In one embodiment, the locking means 9, 10 is provided with the at least one lock protrusion 11. In a preferred embodiment the locking means 9, 10 may be provided with two or more lock protrusions 11. The lock protrusion 11 extend in a radially direction, in relation to a center axis X of the hollow tube, from the outer surface 13 of the locking means 9, 10, and at a first axial end 9a, 10a of the locking means 9, 10. The lock protrusion 11 comprises at least one chamfered side edge 11a, which side edge 11a, 11b extend in a radially direction, in relation to a center axis X. The chamfering of the "front" side edge 11a enables an easier turning/twisting of the locking means 9, 10 from the mounting position to the locked using position which will be explained below in relation to FIG. 4a-b. According to an aspect of the invention, the lock protrusion 11 comprises also a chamfered "back" side edge 11b, which is a back side seen in relation to the turning/twisting motion of the locking means 9, 10 counter-clockwise from the mounting position to the locked using position.

The locking means 9, 10 further comprises one or more first axial securing protrusions 16a, 16b which protrudes in a radial direction from the outer surface 13 of the locking means, at a second axial end 9b, lb of the locking means, which second end 9b, 10b is opposite the first end 9a, 10a. In a preferred embodiment the locking means 9, 10 further comprises one or more resilient tongues 17a, 17b, which protrudes in a radial direction from the outer surface 13 of the locking means 9, 10 and the first axial securing protrusion 16a, 16b is preferably arranged at the resilient tongue 17a, 17b. The respective resilient tongue 17a, 17b further comprises a second axial securing protrusion 18a, 18b, which is arranged at the first axial end 9a, 10a of the locking means 9, 10. By the first and second axial securing protrusions 17a, 17b, 18a, 18b, the locking means 9, 10 may be snapped into the trough hole 19, 20 and is thereby axially secured in both axial directions. The resilient tongue 17a, 17b aims to minimize the play between the locking means 9, 10 and the walls 3, 4 and to act as a bearing for the pivot shaft 7, as mentioned above.

At least one of the locking means 9, 10 is provided with a grip 22 for enabling movement of the locking means 9, 10 from the mounting position to the locked using position. The grip 22 may for example be a flat-shaped groove or through opening, a cross-shaped groove or through opening, a hex grip for a hex key or the like. The grip 22 may also have any other suitable design.

The lock protrusion 11 as well as the clamp 21 comprises preferably resilient material properties, to enable the lock protrusion 11 and/or the clamp 21 to deflect in an axial direction along the axis of rotation X and to achieve the locking action. In another embodiment the resilient properties of the locking means 9, 10 is provided by a resilient means (not shown) between the pivot shaft 7 and the at least one locking means 9, 10, so that the resilient means is pushed outwards in an axial direction of the pivot shaft 7 by the resilient means. One example of the resilient means may be a coil spring.

FIG. 4a-b show side views of a first side 4a of one sidewall 4 of the mounting assembly 1, when the locking means 10 is in a mounting position (to the left) and a in a locked using position (to the right). It is understood that the other sidewall 3 preferably has the same design, why only one of the walls is described here. FIG. 5a shows a zoomed view from above, relating to FIG. 4a-b, and shows an area near the side wall 4 in which one locking means 10 according to the invention is in a locked using position. FIG. 5b is a zoomed view of the stop 25 (stop-protrusion/rotation prevention protrusion) according to the invention.

The wall 4 is provided with two clamps 21 for cooperation with the lock protrusion 11 of the locking means 10. The clamps 21 comprises first and second shanks 21a, 21c connected to each other by an elongate mid-section 21b. The elongate mid-section 21b is a bit thinner near the first shank 21a compared to near the second shank 21c, to provide an entrance opening for the lock protrusion 11. The first and second shanks 21a, 21c are fixedly attached to the first side 4a of the wall 4 and protrudes a first distance a from the first side 4a of the wall 4, such as a receiving space 26 for the lock protrusion 11 is formed between the first side 4a of the wall 4 and the locking clamp 21. As can be seen, a midpoint of the mid-section 21b of the locking clamp 21 is displaced a distance b relative the axis of rotation X of the pivot shaft 7 for allowing the at least one lock protrusion 11 to pass the first shank 21a of the clamp 21 and enter the receiving space 26, when the locking means 9, 10 is rotated into the through opening from the mounting position to the locked using position.

In FIG. 5a and especially in FIG. 5b the stop 25 can be seen. The stop 25 is designed as a rotation prevention protrusion which prevents the lock protrusion 11 from leaving the receiving space 26, if for example the locking means 10 is accidently turned clockwise. The stop 25 is arranged in line with the mid-section 21b of the locking clamp 21 and protrudes from the first side 4a of the wall 4 in direction towards the mid-section 21b of the locking clamp 21. Further, the stop 25 is wedge-shaped with a tip 25a and an, in relation to the tip 25a opposite stop edge 25b. By that, the stop 25 is arranged to, during the rotation of the locking means 10 in the through opening 20, from the mounting position to the locked using position, guide the at least one lock protrusion 1 towards the locked using position. In the (final) locked using position the lock protrusion 11 is locked between the stop edge 25b of the stop 25 and the second shank 21c of the locking clamp 21.

Upon assembly of the mounting assembly 1, the pivot shaft 7, upon which the control pedal 2 is rigidly attached, is introduced between the walls 3, 4. One free end of the pivot shaft 7 is introduced into one of the openings 19 of the walls 3, 4, where after the pivot shaft 7 is angled down such that the other free end of the pivot shaft 7 may be introduced to the other wall 3, 4. Thereafter, a first 9 of the two locking means 9, 10 is arranged onto a first end of the pivot shaft 7 and a second 10 of the two locking means is arranged onto a second end of the pivot shaft 7. To lock the pivot shaft 7 in a desired location, each of the locking means 9, 10 first is oriented such that the lock protrusion 11 is oriented along the clamps 21, in the so called mounting position.

When the locking means 9, 10 reaches the mounting position, the first axial securing protrusions 16a, 16b snaps behind the inside of the wall 4, i.e. engages with the edge of the through opening 19, 20. At the same time the second axial securing protrusions 18a, 18b abuts the first side 3a, 4a of the wall and the resilient tongues 17a, 17b makes sure the play between the locking means 9, 10 and the wall 3, 4 is minimized. After the locking means 9, 10 have been inserted into the wall 4, the locking means 9, 10 is twisted e.g. 90 degrees counter-clockwise from the mounting position, such as the lock protrusion 11 slides over the stop 25 from the tip 25a and then snaps behind the stop edge 25b, into the using position, where the pivot shaft 7 is locked in place, but still pivotable. As the lock protrusion 11 as well as the clamp 21 comprises resilient material properties, the lock protrusion 11 and/or the clamp 21 deflects a bit in the axial direction and the chamfered side edge 11a facilitates a smooth sliding over the stop and may abut the clamp 21. The clamp 21 provides an extra security since it prevents the disengagement of the locking means 9, 10 from the wall by stopping an axial movement of the locking means 9, 10 in an outward direction.

Preferably the mounting assembly 1 is wholly or partly manufactured of a polymeric material. The mounting assembly 1 may in another embodiment be wholly or partly be manufactured of any another material such as (not shown) a metallic material.

The invention claimed is:

1. A mounting assembly and a control pedal of a vehicle comprising:
two walls arranged in parallel in relation to each other, each wall comprising a respective through opening,
a pivot shaft extending between the walls, wherein the pivot shaft has its respective end inserted into the respective through opening,
at least a control pedal rigidly provided on the pivot shaft, the control pedal and the pivot shaft being rotatable around an axis of rotation,
two locking means arranged to pivotally retain the pivot shaft between the walls by that the respective locking means is positioned onto the respective end of the pivot shaft and inserted into the respective through opening of the respective wall, wherein the respective through opening is arranged to receive one locking means and the respective through opening having a shape complementary to the outer circumferential shape of the locking means, and the locking means is rotatable in the through opening from a mounting position to a locked using position, the locking means further comprising at least one lock protrusion extending radially from an outer surface of a first axial end of the locking means, wherein the respective wall of the mounting assembly, on a first side which faces away from the other wall, comprises at least one external locking clamp and at least one stop, which locking clamp and stop the at least one lock protrusion of the locking means is arranged to engage with, when the locking means is in the locked using position, wherein a disengagement of the locking means is prevented.

2. Mounting assembly according to claim 1, wherein the locking clamp comprises first and second shanks connected to each other by an elongate mid-section, wherein the shanks further are fixedly attached to the first side of the wall and protrude a first distance from the first side of the wall such that a receiving space for the lock protrusion of the locking means is formed between the first side of the wall and the locking clamp.

3. Mounting assembly according to claim 2, wherein a midpoint of the mid-section of the locking clamp is displaced a distance (b) relative the axis of rotation of the pivot shaft for allowing the at least one lock protrusion to pass the first shank of the clamp and enter the receiving space, when the locking means is rotated into the through opening of the wall from the mounting position to the locked using position.

4. Mounting assembly according to claim 2, wherein the mid-section of the locking clamp is thinner near the first shank compared to near the second shank.

5. Mounting assembly according to claim 1, wherein the stop is arranged in line with the mid-section of the locking clamp and protrudes from the first side of the wall in direction towards the mid-section of the locking clamp.

6. Mounting assembly according to claim 1, wherein the stop is wedge-shaped with a tip and an, in relation to the tip opposite stop edge, wherein the stop is arranged to, during the rotation of the locking means in the through opening from the mounting position to the locked using position, guide the at least one lock protrusion towards the locked using position, in which the lock protrusion is locked between the stop edge of the stop and the second shank of the locking clamp.

7. Mounting assembly according to claim 1, wherein the locking clamp is resilient.

8. Mounting assembly according to claim 1, wherein the lock protrusion comprises at least one chamfered side edge which side edge extends radially from the outer surface of the locking means.

9. Mounting assembly according to claim 1, wherein the locking means further comprises one or more first axial securing protrusions protruding in a radial direction from the outer surface of the locking means, the first axial securing protrusions being arranged at a second axial end of the locking means.

10. Mounting assembly according to claim 1, wherein the locking means further comprises one or more resilient tongues protruding in a radial direction from the outer surface of the locking means.

11. Mounting assembly according to claim 10, wherein the resilient tongue comprises the first axial securing protrusion.

12. Mounting assembly according to claim 10, wherein the resilient tongue comprises a second axial securing protrusion arranged at the first axial end of the locking means.

13. Mounting assembly according to claim 1, wherein the at least one locking means is provided with a grip for enabling movement of the locking means from the mounting position to the locked using position.

14. Mounting assembly according to claim 1, wherein the mounting assembly is manufactured of a polymeric material.

* * * * *